United States Patent [19]

Perelli

[11] 4,328,869
[45] May 11, 1982

[54] IMPLEMENT WITH WING LIFT INCLUDING TOGGLE LINKS AND ROLLER

[75] Inventor: Marvin P. Perelli, Grimsby, Canada

[73] Assignee: International Harvester Company, Chicago, Ill.

[21] Appl. No.: 235,279

[22] Filed: Feb. 17, 1981

[51] Int. Cl.³ .............................................. A01B 73/00
[52] U.S. Cl. .................................. 172/311; 172/459; 172/619
[58] Field of Search ................ 172/311, 446, 456, 662

[56] References Cited

U.S. PATENT DOCUMENTS

| | | | |
|---|---|---|---|
| 3,814,191 | 6/1974 | Tilbury | 172/311 |
| 4,023,623 | 5/1977 | Anderson | 172/311 |
| 4,116,282 | 9/1978 | Hansen | 172/311 |
| 4,178,998 | 12/1979 | Rockwell | 172/311 |

Primary Examiner—Richard T. Stouffer
Attorney, Agent, or Firm—James J. Getchius; F. D. Au Buchon

[57] ABSTRACT

An implement with a wing lift wherein the wing is displaceable from a wheel supported floating, ground working position approximately 180° to a transport position where it lies inverted on the implement. The wing lift includes a pair of toggle links with one link pivotally connected to the wing hinge, a stop on the wing hinge, a lift arm pivotally connected to the implement central frame hinge structure and to the other toggle link and a hydraulic cylinder mounted on the central frame with the rod end pivotally connected to the lift arm and the other link of the toggle links. The lift arm also has a roller for contact by the wing hinge ramp. The toggle link construction allows the wing to float upwardly and downwardly in the working position without affecting the cylinder. The toggle links, upon abutting the stop, raise the wing when the cylinder is retracted until the links break wherein the roller engages the wing hinge ramp to support the wing to and in the inverted position without wing fall. The procedure is reversed when the cylinder is extended to return the wing to the working position.

3 Claims, 8 Drawing Figures

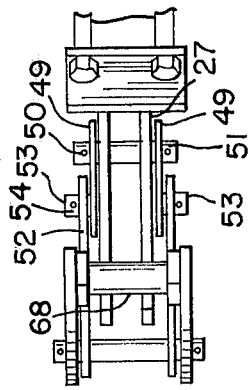
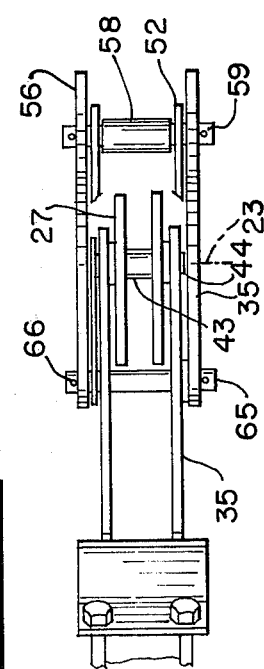
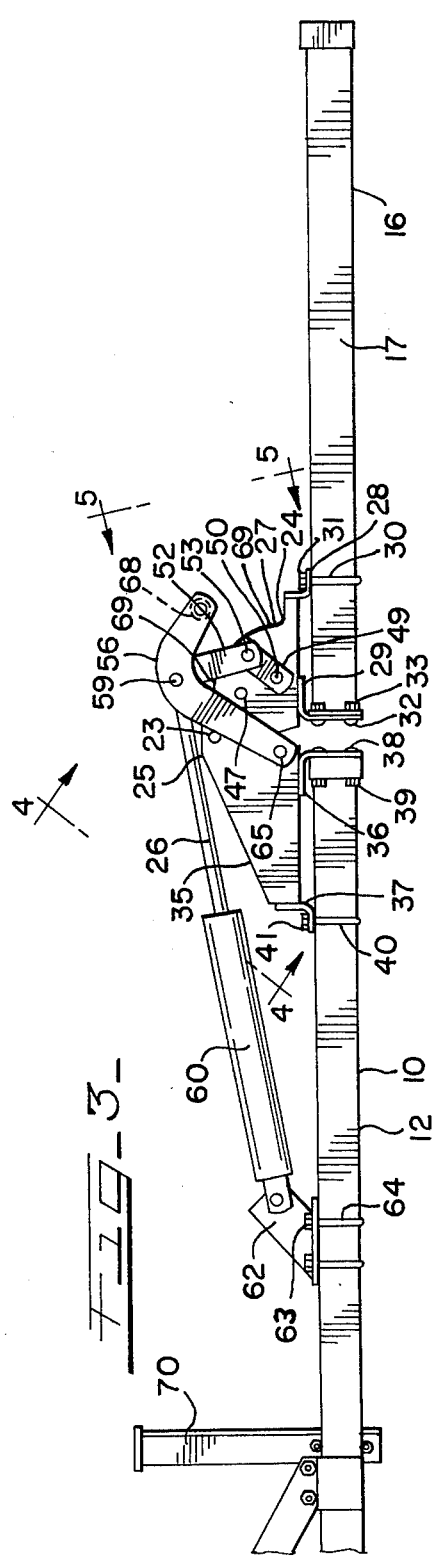

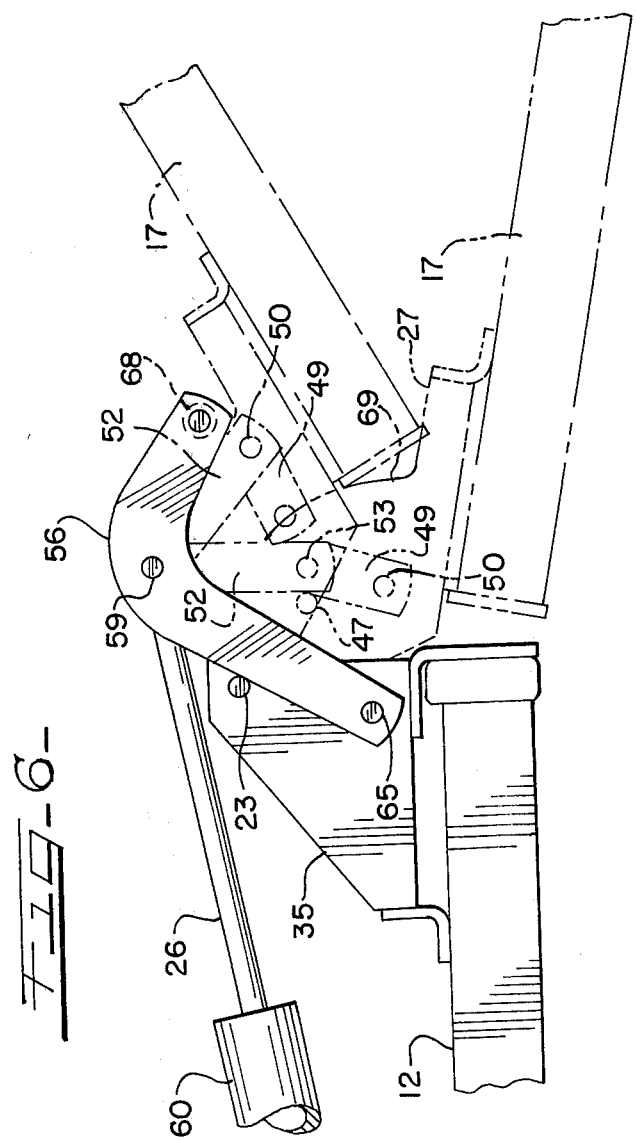

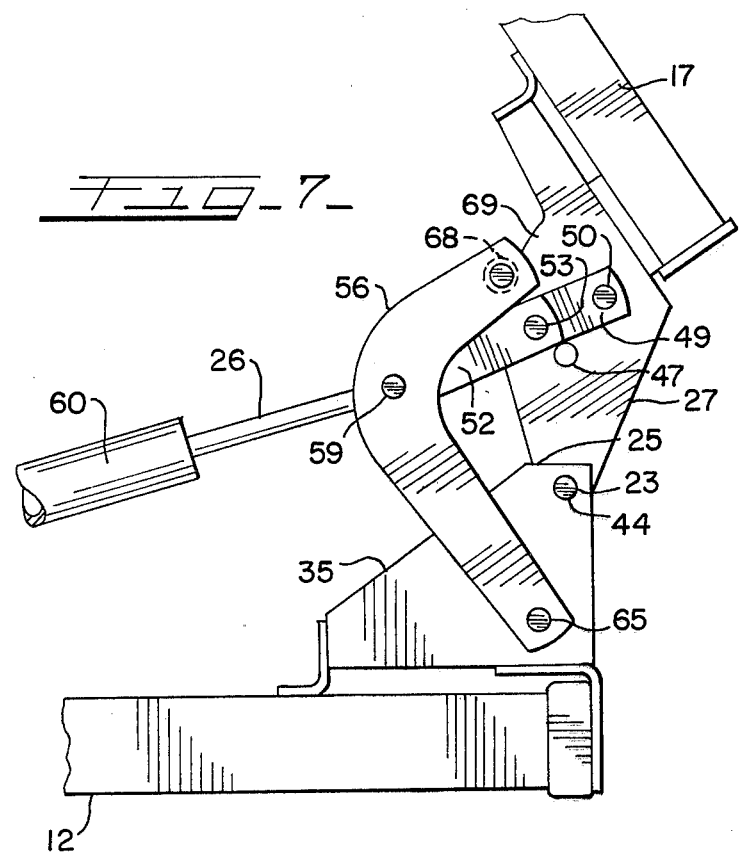
FIG_7
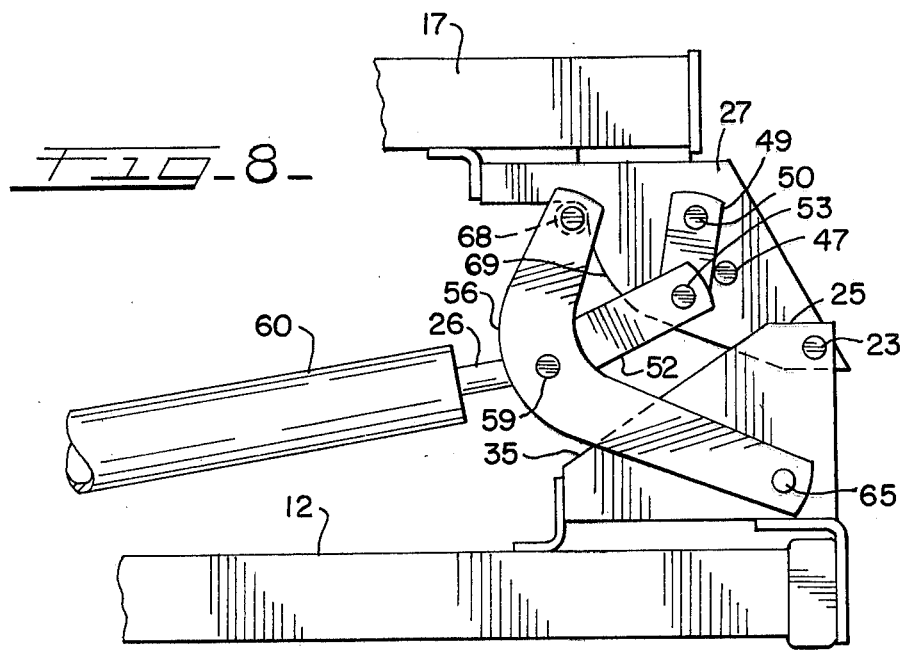
FIG_8

IMPLEMENT WITH WING LIFT INCLUDING TOGGLE LINKS AND ROLLER

FIELD OF THE INVENTION

This invention pertains generally to agricultural implements foldable between working and transport positions.

DESCRIPTION OF THE PRIOR ART

Implements such as cultivators, which are transversely lengthy in the working position to cover large spans of soil must be folded to a smaller transport position to traverse narrow roads. If merely folded or lifted 90° to a vertical position, the ground working tools extend laterally therefrom to provide excess width. Also an unstable condition frequently results from this rather tall configuration.

SUMMARY OF THE INVENTION

Applicant, as a consequence, designed a tool carrying implement having a wing that can be lifted and folded 180° so that it rests on the central frame section of the implement with the tools thereon extending upwardly. Further, Applicant provides a toggle like arrangement wherein the wheel supported wing can follow the contour of the ground, moving upwardly or downwardly in relation to the wheel supported central frame without working the wing lift hydraulic cylinder. This float, is not provided by a lost motion connection or slotted holes that can cause the wing to fall at anytime during the 180° folding process. Instead, the wing is controlled at all times during the process for increased safety and no damage to the implement. Specifically, Applicant utilizes a pair of toggle links with one link connected to the wing hinge which has up and down stops to limit the float. The down stop also prevents the links from moving over center. When the hydraulic cylinder that is mounted on the central frame section is contracted, the lift arm that is also pivotally mounted on the central frame section hinge and connected to the cylinder rod along with the other toggle link pulls the links against the down stop and then moves the wing upwardly. At the neutral position over the hinge pivot, a roller on the lift arm extension engages a ramp on the wing section hinge thereby supporting the wing with no load on the toggle links which are straight and in contact with the stop only up to the neutral point, until the 180° position is reached. A fixed support on the central frame section may also be utilized to support the other end of the wing. Extension of the cylinder to move the wing to the working position also starts with the load applied by the roller as the toggle links are not straight at this point and are ineffective. At the neutral point they are straight and support the wing under tension via the stop until the wing is again in the working position supported on its wheel and the toggle links remote from the down stop and free to flex with the wing. While one wing is shown it is clear that another wing could be provided on the other side of the central frame section.

It is, therefore, an object of this invention to provide a new and improved implement with a wing lift.

Another object of this invention is to provide upward and downward float of the wheel supported wing without pumping the hydraulic lift cylinder.

Another object of this invention is to provide a 180° upward and downward wing fold with no wing drop.

BRIEF DESCRIPTION OF THE DRAWINGS

FIG. 3 is an enlarged view of the rear hinge area between the central frame section and the wing in the working position;

FIG. 4 is a view taken along line 4—4 of FIG. 3;

FIG. 5 is a view taken along line 5—5 of FIG. 3;

FIG. 6 is an enlarged view similar to FIG. 3 showing via broken lines the down float and up float positions of the wing during ground working;

FIG. 7 is a view of the hinge area with the wing at the neutral position; and

FIG. 8 is a view of the hinge area in the 180° folded position.

DESCRIPTION OF THE PREFERRED EMBODIMENT

Figure 1:
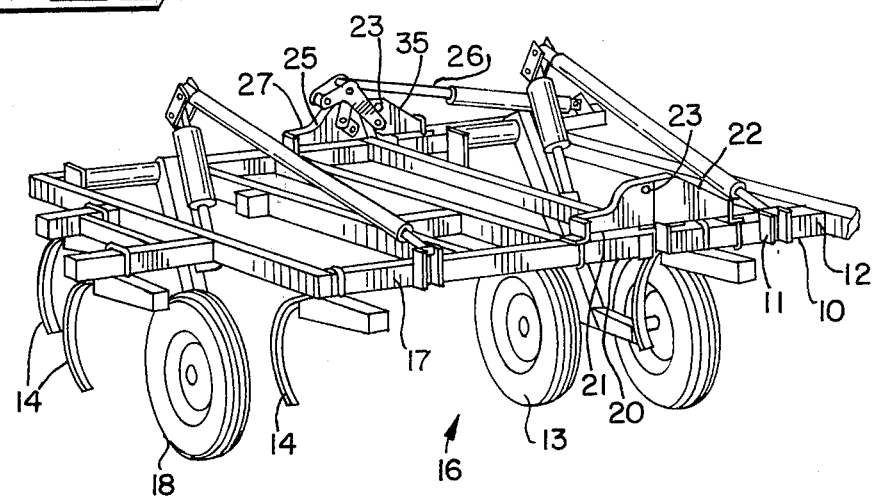
FIG. 1 is a perspective front view of an implement showing a portion of the central frame section and a wing in the working position.
Figure 2:
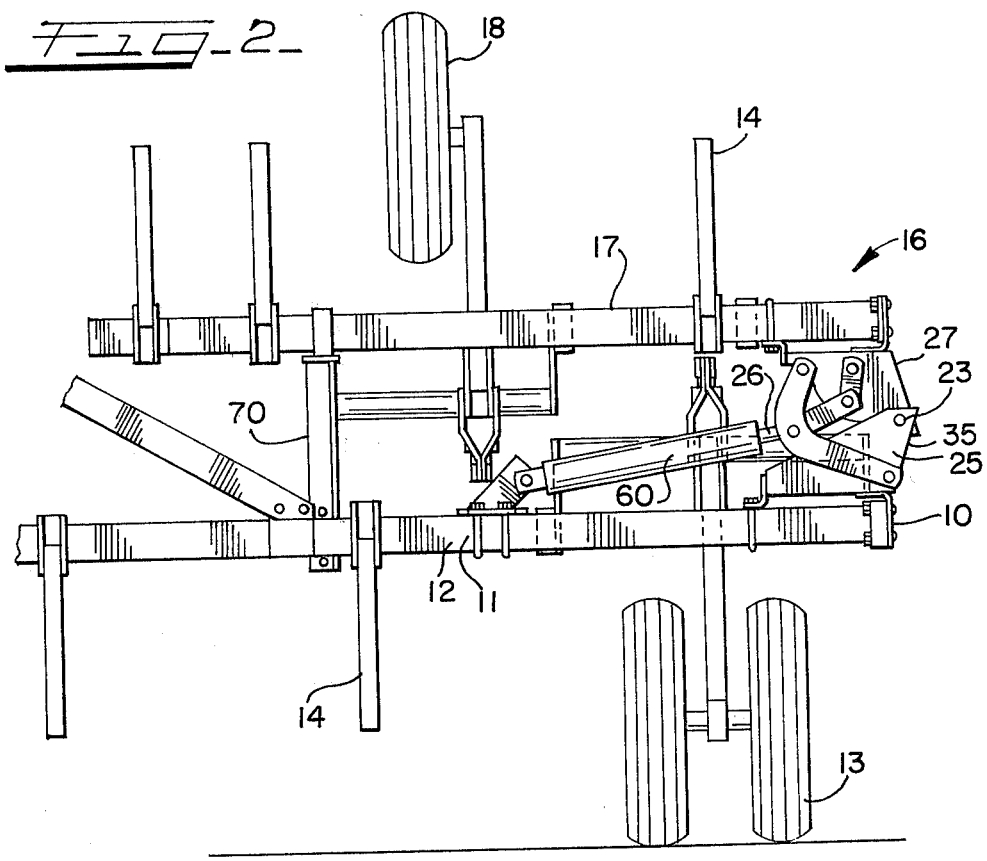
FIG. 2 is a rear view of the implement of FIG. 1 showing the wing in the 180° folded position with the tools extending upwardly.

Referring to FIGS. 1 and 2, 10 indicates an implement (cultivator) with a wing lift. Implement 10, which is only shown in part, includes a central section 11 having a frame 12 supporting bogie ground wheels 13 and a plurality of ground working tools 14. Implement 10 also includes a draw bar (not shown) for connection to a farm tractor forward of the implement shown in FIG. 1.

Wing 16 includes frame 17 for support of ground wheel 18 shown and a plurality of tools 14. Wing 16 is pivotally connected to central section 11 by front hinge 20 composed of wing bracket 21 and central section bracket 22 about hinge axis 23 located well above the central section. (See FIG. 1). Front hinge 20 is of conventional construction.

Wing 16 is also connected to central section 11 by rear hinge 25 about axis 23. Rear hinge 25, is shown best in FIGS. 3, 4, 5, 6, 7 and 8, along with the hydraulic powered folding means 26. Rear hinge 25 includes bracket 27 which is a weldment composed of spaced plates welded to angles 28 and 29. Angle 28 is fastened to wing frame 17 by a U-bolt 30 and nuts 31. Angle 29 is fastened to wing frame 17 by bolts 32 and nuts 33. Also a part of rear hinge 25 is triangular bracket 35 which is also a weldment composed of spaced plates welded to angles 36 and 37 by bolts 38 and nuts 39 and U-bolt 40 and nuts 41. Bracket 27 is narrower than bracket 35 and fits therebetween. Bracket 27 has fixed collar 43 which provides a bearing for pin 44 pivotally joining the brackets and defining axis 23 for hinge 25. Pin 44 is maintained in position in the collar via suitable fasteners not shown. Both brackets 27 and 35 have suitable reinforcing structure between the plates as needed. Also a part of bracket 27 is stop pin 47 which extends beyond the plates of the bracket for contact with toggle link 49. Toggle link 49 consists of two plates that are pivotally mounted on opposing sides of the plates of the bracket 27 on pin 50 which is maintained in position by suitable cotter pins 51 shown. Toggle link 49 is also pivotally connected to toggle link 52 which consists of two links located laterally outwardly of toggle link 49 by pins 53 and cotter pins 54. Pins 53 only extend between the toggle links and not into bracket 27.

Toggle link 52 also extends upwardly and is pivotally connected to lift arm 56. Lift arm 56 also is composed of separate plates that straddle toggle link 52 with sleeve 58 therebetween. Pin 59 extends therethrough and is maintained in position by suitable cotter pins. Between the plates of toggle link 59 is the rod end of double acting hydraulic cylinder 60. Thus, the rod end is pivotally connected to both the toggle link 52 and the lift arm 56 at the same point. The base end of cylinder 60 is pivotally connected to bracket 62 and thus frame 12 of central section 11 by U-bolts 64 and nuts 63. Lift arm 56 also is pivotally connected to bracket 35 at its lower end by pin 65 and cotter pins 66. At its upper end, and as shown best in FIG. 6, lift arm 56 has roller 68 pivotally mounted between the plates of the lift arm. Roller 68 is adapted to engage curved ramp 69 of bracket 27 to support the wing 17 when the wing is elevated and the toggle links broken.

In operation, referring to FIG. 6, the wing is shown in broken lines in the working position with the upper position showing the up float provided when wing wheel 18 encounters an obstacle and raises in relation to central frame 11. It is to be noted that in this position the up float occurs without affecting cylinder 60. Also that roller 68 provides an up stop in conjunction with ramp 69. In the down float position the toggle links are also broken and pin 47 provides a down stop. The float in either direction starts from the normal working position shown in FIG. 3.

If it is desired to fold or lift the wing after the tools of the central section and wing have been lifted from the ground via wheels 13 and 18, the cylinder 60 is retracted. The cylinder rod first pulls the lift arm and the toggle link 52 and thus 49 against the stop 47 and the wing starts to raise. At the neutral position shown in FIG. 7 the links are in line and the load is on the hinge pin 44 which defines the axis 23. The roller 68 at this point engages ramp 69 of the bracket 27 and supports the wing as the toggle links break. The cylinder now moves the wing 16 to the inverted 180° position shown in FIG. 8 and FIG. 2. The wing 16 may also be supported on stand 70 on central frame section 12.

To lower the wing the cylinder is extended and the roller 68 against the ramp 69 again moves the wing to the position of FIG. 7 where the toggle links under tension alone, lower the wing to the working position of FIG. 3 with the roller moving away from the ramp.

Thus the wing is under control through the entire folding procedure without wing fall while maintaining a float capability without affecting the cylinder in the working position.

What is claimed is:
1. An agricultural implement comprising:
 (a) a central section having ground wheels and depending ground working tools and a hinge bracket;
 (b) a transversely extending wing having a ground wheel and depending ground working tools and a wing hinge bracket hinged to said central section bracket on an axis above said central section for movement from an aligned working position though approximately 180° to a transport position wherein the wing is inverted over said central section; and
 (c) a hydraulically powered folding means extending between said central section and said wing section to effect the wing movement, said folding means comprising: a pair of toggle links pivotally connected to each other, one of said links being pivotally connected to said wing hinge bracket, a lift arm pivotally connected to said central section hinge bracket and to the other of said links, a hydraulic cylinder pivotally mounted on said central section and having its rod end pivotally connected to said lift arm and said other link, stop means mounted on said wing hinge bracket, said toggle links providing wing float during working, said cylinder rod upon retraction, drawing said one toggle link against said stop means and lifting said wing, and support means for supporting said wing without wing fall when the toggle links have broken as the wing moves to the inverted transport position and return, said support means comprising a ramp on said wing hinge bracket and a roller mounted on said lift arm for contact therewith.

2. The implement of claim 1 in which said roller is further positioned to serve as an up stop to limit upward float of said wing by contact with said ramp.

3. The implement of claim 2 in which said stop means is positioned adjacent said one link, said stop means also acting as a down stop to limit downward float of said wing.

* * * * *